(12) United States Patent
Wieland et al.

(10) Patent No.: US 7,083,775 B2
(45) Date of Patent: Aug. 1, 2006

(54) PROCESS FOR THE AUTOTHERMAL CATALYTIC STEAM REFORMING OF HYDROCARBONS

(75) Inventors: Stefan Wieland, Offenbach (DE); Frank Baumann, Alzenau (DE); Rainer Ahlborn, Hanau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 09/853,902

(22) Filed: May 14, 2001

(65) Prior Publication Data

US 2002/0009408 A1    Jan. 24, 2002

(30) Foreign Application Priority Data

May 20, 2000    (DE) .............................. 100 25 032

(51) Int. Cl.
*C01B 3/26*    (2006.01)

(52) U.S. Cl. .................................... 423/652; 252/373

(58) Field of Classification Search ................. 502/325, 502/333, 334, 339; 423/650, 651, 652, 653, 423/654; 252/373

See application file for complete search history.

(56) References Cited

U.S. PATENT DOCUMENTS

| | | | | |
|---|---|---|---|---|
| 4,367,166 A * | 1/1983 | Fujitani et al. | | |
| 4,522,894 A * | 6/1985 | Hwang et al. | ................. | 429/17 |
| 4,743,576 A | 5/1988 | Schneider et al. | | |
| 4,755,498 A | 7/1988 | Setzer et al. | | |
| 4,844,837 A * | 7/1989 | Heck et al. | ................. | 252/373 |
| 4,927,857 A * | 5/1990 | McShea et al. | ............. | 518/703 |
| 5,112,527 A * | 5/1992 | Kobylinski | .................. | 252/373 |
| 5,883,138 A * | 3/1999 | Hershkowitz et al. | ...... | 252/373 |
| 6,267,912 B1 * | 7/2001 | Hershkowitz et al. | ...... | 423/650 |
| 6,293,979 B1 * | 9/2001 | Choudhary et al. | .......... | 423/651 |
| 6,331,283 B1 * | 12/2001 | Roy et al. | .................... | 423/652 |
| 6,342,465 B1 * | 1/2002 | Klein et al. | ................. | 502/339 |
| 6,376,423 B1 * | 4/2002 | Yagi et al. | ................... | 423/651 |
| 6,436,363 B1 * | 8/2002 | Hwang et al. | .............. | 423/651 |
| 6,458,334 B1 * | 10/2002 | Tamhankar et al. | ......... | 423/651 |
| 6,524,550 B1 * | 2/2003 | Chintawar et al. | .......... | 423/650 |
| 6,749,828 B1 * | 6/2004 | Fukunaga | .................... | 423/651 |
| 2002/0150532 A1 * | 10/2002 | Grieve et al. | | |

FOREIGN PATENT DOCUMENTS

| | | |
|---|---|---|
| DE | 197 27 841 | 7/1999 |
| EP | 0112613 | 4/1984 |
| WO | WO 99/48805 | 9/1999 |

OTHER PUBLICATIONS

Wo 99/64150, Dec. 16, 1999.*
EPO Search Report.

* cited by examiner

*Primary Examiner*—Wayne A. Langel
(74) *Attorney, Agent, or Firm*—Kalow & Springut LLP; John J. Santalone

(57) ABSTRACT

A process for autothermal catalytic steam reforming of hydrocarbons by passing a reactant mixture of hydrocarbons, oxygen and water or water vapor, heated to a preheating temperature, over a catalyst. The process is operated adiabatically and the catalyst has a coating of a catalyst material on a support structure, the catalyst material containing at least one platinum group metal on an oxidic support material which can be aluminum oxide, silicon dioxide, titanium dioxide or mixed oxides thereof and zeolites.

15 Claims, No Drawings

PROCESS FOR THE AUTOTHERMAL CATALYTIC STEAM REFORMING OF HYDROCARBONS

INTRODUCTION AND BACKGROUND

The present invention relates to a process for the autothermal catalytic reforming of hydrocarbons by passing a reactant mixture consisting of hydrocarbons, oxygen and water or water vapour, heated to a preheating temperature, over a catalyst.

For the production of hydrogen, as is well-known, hydrocarbons are reacted at high temperatures in the presence of water vapour on a suitable catalyst to give hydrogen, carbon monoxide and carbon dioxide. The reaction is highly endothermic and proceeds, for example, in accordance with the following reaction equation:

$$C_8H_{18} + 8\,H_2O = 8\,CO + 17\,H_2 \quad (1)$$
$$\Delta H = +1250 \text{ kJ/mol}$$

The so-called steam/carbon ratio S/C (Steam to Carbon ratio) is characteristic of this reaction. In reaction equation (1), S/C is equal to 1.

Another possibility known for the production of hydrogen is catalytic partial oxidation CPO (Catalytic Partial Oxidation). In this case, the hydrocarbons are reacted in the presence of oxygen on a catalyst, for example in accordance with reaction equation (2), to give carbon monoxide and hydrogen. An important characteristic for partial oxidation is the air index $\lambda$, which is defined as the ratio of the number of moles of oxygen used to the number of moles of oxygen required for complete oxidation (see reaction equation (3)):

$$C_8H_{18} + 4\,O_2 = 8\,CO + 9\,H_2\ \lambda = 0.32\ \Delta H = -685 \text{kJ/mol} \quad (2)$$

$$C_8H_{18} + 12.5\,O_2 = 8\,CO_2 + 9\,H_2O\ \lambda = 1\ \Delta H = -5102 \text{ kJ/mol} \quad (3)$$

The present invention deals with another possibility for obtaining hydrogen, so-called autothermal steam reforming. This process combines catalytic partial oxidation with steam reforming, wherein exothermic partial oxidation supplies the heat of reaction required for subsequent endothermic steam reforming. The reactant mixture may be preheated to a preheating temperature. The product mixture at the temperature prevailing at the reactor outlet is found in the thermodynamic equilibrium of the water gas shift reaction. Autothermal steam reforming combines the advantages of catalytic partial oxidation (good starting characteristics) with those of steam reforming (high hydrogen yields).

U.S. Pat. No. 4,415,484 discloses a catalyst for use in an autothermal reforming reactor. The catalyst contains 0.01 to 6% rhodium, as well as 10 to 35% calcium oxide on a support made from aluminium oxide which is also promoted with about 3 to 15% magnesium. The catalyst is used in the form of pellets and is characterised in particular by a low tendency to coke at low oxygen/carbon ratios. A typical catalyst system for performing autothermal reforming, according to that document, contains, on about one third of its length, an iron oxide catalyst for partial oxidation and, on two thirds of its length, the rhodium catalyst described above.

WO 98/55227 describes a bifunctional catalyst for the partial oxidation of hydrocarbons. It has a dehydrogenating activity for dehydrogenating hydrocarbons as well as the ability selectively to oxidize hydrocarbon chains. The dehydrogenation activity is provided by metals in the eighth group of the periodic system, while selective oxidation is achieved by ionized oxygen. Sources of ionized oxygen are oxides which crystallise with a fluorite structure or a perovskite structure such as, for example, zirconium oxide, cerium oxide, bismuth oxide, etc. A preferred catalyst is, for example Pt/CeGdO. It is used in pelleted form with diameters of 1.125 to 1.5 inches.

WO 99/48805 describes a process for the catalytic production of hydrogen by self-sustaining partial oxidation and steam reforming of hydrocarbons, wherein a mixture of the hydrocarbons and an oxygen-containing gas and optionally steam is reacted on a catalyst which contains rhodium dispersed on a support material which contains cerium and zirconium as cations. The catalyst is used in granulated form.

DE 197 27 841 A1 describes a process and a device for autothermal reforming of hydrocarbons in which the fuel is supplied to a two-stage reforming reactor via a feeding device. The reformate being produced is passed into a heat exchanger in counterflow and, in the heat-exchanged form, is passed into the starting substances, supplied from the outside to the inside, for reforming. The fuel supplied via the feeding device, with the starting substance, is applied directly to the reaction zone which contains a catalyst, in which combustion and reforming or catalysis is performed. The reforming reactor contains, in an upper region, a honeycomb structure coated with catalyst and, in a lower region, a packing material coated with catalyst. A honeycomb structure may also be used instead of the packing material.

Autothermal steam reforming seems to be a suitable process for producing hydrogen on board in a motor vehicle operated with fuel cells because with this process the hydrogen required for operating the fuel cells can be obtained from the fuels used for conventional internal combustion engines. An essential factor for this field of use is the hydrogen productivity which may be given with respect to both the volume of the catalyst, equation (4), and also the mass of the noble metal used, (equation (5):

$$P_{Kat} = \frac{V_{H2}}{V_{Kat} \cdot t} \left[ \frac{Nm^3}{1_{Kat} \cdot h} \right] \quad (4)$$

$$P_{EM} = \frac{V_{H2}}{M_{EM} \cdot t} \left[ \frac{Nm^3}{g_{EM} \cdot h} \right] \quad (5)$$

$P_{Kat}$: hydrogen productivity with respect to the volume $V_{Kat}$ of catalyst $P_{EM}$: hydrogen productivity with respeect to the mass of noble metal $V_{H2}$: volume of hydrogen under standard conditions $t$: time An object of the present invention is to provide a process for autothermal steam reforming which is characterized by a very high hydrogen productivity and is thus particularly suitable for use in mobile systems.

SUMMARY OF THE INVENTION

The above and other objects of the invention can be achieved by a process for autothermal catalytic steam reforming of hydrocarbons by passing a reactant mixture consisting of hydrocarbons, oxygen and water or water vapour, heated to a preheating temperature, over a catalyst. The process is characterized in that it is operated adiabatically and the catalyst has a coating of catalyst material on a carrier structure, the catalyst material containing at least one platinum group metal on an oxidic support material from the group comprising aluminium oxide, silicon dioxide, titanium dioxide or mixed oxides thereof and zeolites.

The process is a one-step process, that is to say the reactant mixture is passed over a single catalyst which is able to provide the energy required for endothermic steam reforming in the point of entry region of the catalyst by catalytic partial oxidation of the reactant mixture. In this case, the temperature of the reactant mixture is increased from the preheating temperature to the required reaction temperature of between 600 and 900° C. Partial oxidation and steam reforming thus merge smoothly into each other.

The catalyst to be used according to the invention contains, on a carrier structure, a catalyst material which is applied in the form of a coating on the geometric surfaces of the carrier structure. Preferred carrier structures are monolithic honeycomb structures made of ceramic or metal, open-cell ceramic or metallic foam structures, metal sheeting or irregularly shaped components. The thickness of the catalytic coating is generally between 20 and 100 μm.

An advantage of this catalyst arrangement is its relatively low heat capacity. In addition, the entire catalyst material is very accessible to the reactants due to it being spread out in the form of a layer. This leads to a very high specific catalyst activity and to high dynamics in the catalyst process, that is to say the process can very rapidly follow the varying demands for hydrogen production in the motor vehicle. It is also essential that the process be operated adiabatically. Thus, no heat is extracted from the catalysis process in a heat exchanger, as is the case for example in the reactor in accordance with DE 197 27 841 A1. The process according to the invention thus has a very short start-up time after cold starting the motor vehicle because unnecessary components do not have to be heated to the operating temperature.

The catalyst material contains at least one platinum group metal on a finely divided oxidic support material. The catalyst material is thus a carried catalyst or a supported catalyst. The expression supported catalyst in the context of this invention refers only to the catalyst material and is clearly differentiated from the catalyst which consists of the carrier body with the supported catalyst applied thereto in the form of a coating.

Suitable oxidic support materials for the platinum group metals are oxides from the group comprising aluminum oxide, silicon dioxide, titanium dioxide or mixed oxides thereof and zeolites. Materials with a specific surface area of more than 10 $m^2/g$ are preferably used in order to enable the highest possible distribution of the catalytically active components over this large surface area. The techniques for preparing this type of supported catalyst and for coating an inert carrier structure are well known to a person skilled in the art.

For the purposes of thermal stabilization and as promoters, the catalyst material may also contain at least one oxide chosen from the group consisting of boron oxide, bismuth oxide, gallium oxide, oxides of the alkali metals, oxides of the alkaline earth metals, oxides of the B group elements and oxides of the rare earth metals in a concentration of up to 40 wt. %, with respect to the total weight of catalyst material.

The catalyst material preferably contains, as noble metal, 0.1 to 2 wt. % of rhodium, with respect to its total weight. Rhodium has a high activity for steam reforming, wherein at the same time its oxidation activity is low compared to that of platinum. This means that partial oxidation of the reactant mixture at the point of entry to the catalyst is damped down and high temperature peaks which could destroy the catalyst are avoided. In order to adapt the oxidation activity to the requirements of the process, the catalyst material may also contain platinum with a ratio by weight of rhodium to platinum of between 20:1 and 2:1, preferably 10:1 to 3:1. In this case, it is important that the proportion by weight of platinum is lower than that of rhodium in order to avoid too vigorous oxidation at the point of entry to the catalyst.

Preferably, a catalyst material is used which contains rhodium and optionally platinum on an active aluminum oxide. This catalyst material may also contain cerium oxide in order to reduce the deposition of soot and to increase sulfur resistance.

The process may be operated with aliphatic or aromatic hydrocarbons or mixtures of hydrocarbons such as gasoline or diesel oil. Depending on the hydrocarbon used, steam/carbon ratios, S/C, between 0.7 and 4 may be used. The air index λ of the reactant mixture and its preheating temperature are then chosen so that a temperature between 600 and 900° C. is set at the outlet from the catalyst.

The proposed process represents only one part of an overall process for obtaining hydrogen on board a motor vehicle fitted with fuel cells. The overall process includes, in addition to autothermal reforming, process steps for removing carbon monoxide from the reformate by, for example, one or more water gas shift steps. In addition, the overall process includes catalytic combustion of the anode exhaust gas from the fuel cells. The reactions involved in the water gas shift steps and catalytic combustion are exothermic and, during continuous operation, provide the amount of heat required to preheat the reactant mixture to a suitable preheating temperature between about 270 and 350° C.

During a cold start, the catalyst is operated briefly with a reactant mixture which contains only hydrocarbons and atmospheric oxygen in order rapidly to heat the entire system to the operating temperature by catalytic partial oxidation on the catalyst. After reaching the operating temperature, a transfer is made to autothermal reforming by supplying water vapour to the reactant mixture. As an alternative, the operating temperature may also be set by using other preheating measures.

EXAMPLE 1

A mixture of isooctane and toluene (50 wt. % of each) was reformed by the process according to the invention.

The catalyst used in the process was a catalytically coated ceramic honeycomb structure with a cell density of 62 cells per square centimeter and a volume of 35 ml. The catalytic coating consisted of a rhodium/aluminum oxide supported catalyst and was applied to the honeycomb structure in a concentration of 150 grams per liter. The coating concentration of rhodium was 1 g/l.

To perform autothermal reforming, the liquid hydrocarbons were vaporized. Then the vaporized reactants and the air required were each heated separately to 350° C. and then passed over the catalyst, together, in order initially to preheat it to its operating temperature of about 600° C. by catalytic partial oxidation. After reaching the operating temperature, the water vapour required was metered into the reactant mixture. Under steady-state operation, the catalyst was loaded with the following amounts of substances:

| | |
|---|---|
| Isooctane/toluene: | 267 g/h |
| Water: | 526 g/h |
| Air: | 908 Nl/h |

The temperature of the product gas mixture leaving the catalyst was between 680 and 700° C.

The dry reformate contained 36 vol. % hydrogen, 12.2 vol. % carbon monoxide, 11.8 vol. % carbon dioxide and 40 vol. % nitrogen. From these figures a hydrogen productivity of $P_{Kat}=39$ Nm³/lh, or $P_{EM}=39$ Nm³/gh, was calculated.

EXAMPLE 2

Isooctane was reformed by the process according to the invention. The same catalyst and the same operating conditions as described in example 1 were used.

Under steady-state operation, the catalyst was loaded with the following amounts of substances:

| | |
|---|---|
| Isooctane: | 267 g/h |
| Water: | 509 g/h |
| Air: | 981 Nl/h |

The temperature of the product gas mixture leaving the catalyst was between 680 and 700° C.

The dry reformate contained 37 vol. % hydrogen, 12.0 vol. % carbon monoxide, 9.4 vol. % carbon dioxide and 40.6 vol. % nitrogen. From these figures a hydrogen productivity Of $P_{Kat}=40$ Nm³/lh, or $P_{EM}=40$ Nm³/gh, was calculated.

In comparison, in example 7 in WO 99/48805, with the assumption of a typical bulk density for the catalyst granules of 500 g/l, a hydrogen productivity of only $P_{Kat}=1.8$ Nm³/lh, or $P_{EM}=3.6$ Nm³/gh, was produced.

The hydrogen productivity of the process according to the invention is thus more than an order of magnitude greater than that of the known process and therefore enables a substantial reduction in the size of the reactor required, given the same hydrogen production.

Further variations and modifications of the foregoing will be apparent to those skilled in the art and are intended to be encompassed by the claims appended hereto.

German priority application 100 25 032.7 is relied on and incorporated herein by reference.

We claim:

1. A process for autothermal catalytic steam reforming of hydrocarbons comprising preheating a reactant mixture of hydrocarbons, oxygen and water or water vapor to a preheating temperature, passing the preheated reactant mixture over a single catalyst adiabatically, the catalyst having a coating of a catalyst material on a carrier structure, the catalyst material containing rhodium in a concentration of 0.1 to 2 wt. %, with respect to its total weight, on an oxidic support material selected from the group consisting of aluminum oxide, silicon dioxide, titanium oxide and mixed oxides thereof and zeolites.

2. The process according to claim 1, wherein said catalyst material further contains at least one oxide selected from the group consisting of boron oxide, bismuth oxide, gallium oxide, oxides of the alkali metals, oxides of the alkaline earth metals, oxides of the B group elements and oxides of the rare earth metals in a concentration of up to 40 wt.%, with respect to the total weight of catalyst material.

3. The process according to claim 1, wherein the catalyst material also contains platinum with a ratio by weight of rhodium to platinum of between 20:1 and 2:1.

4. The process according to claim 1, wherein said active aluminum oxide is the support material for rhodium and optionally platinum.

5. The process according to claim 3, wherein said active aluminum oxide is the support material for rhodium and optionally platinum.

6. The process according to claim 4, wherein the catalyst material also contains cerium oxide.

7. The process according to claim 5, wherein the catalyst material also contains cerium oxide.

8. The process according to claim 6, wherein a monolithic honeycomb structure made from ceramic or metal, open-cell ceramic or metal foam structures, metal sheeting or irregularly shaped components is the carrier structures for the catalytic coating.

9. The process according to claim 5, wherein a monolithic honeycomb structure made from ceramic or metal, open-cell ceramic or metal foam structures, metal sheeting or irregularly shaped components is the carrier structures for the catalytic coating.

10. The process according to claim 8, wherein the reactant mixture contains aliphatic or aromatic hydrocarbons or hydrocarbon mixtures.

11. The process according to claim 7, wherein the reactant mixture contains aliphatic or aromatic hydrocarbons or hydrocarbon mixtures.

12. The process according to claim 10, wherein the air index λ of the reactant mixture and its preheating temperature are chosen so that a temperature between 600 and 900° C. is set at the outlet from the catalyst.

13. The process according to claim 11, wherein the air index λ of the reactant mixture and its preheating temperature are chosen so that a temperature between 600 and 900° C. is set at the outlet from the catalyst.

14. The process according to claim 12, wherein a S/C ratio between 0.7 and 4 is set in the reactant mixture.

15. The process according to claim 13, wherein a S/C ratio between 0.7 and 4 is set in the reactant mixture.

* * * * *